No. 828,838. PATENTED AUG. 14, 1906.
J. A. CHAMBERS.
COMBINED TANK AND POT FURNACE.
APPLICATION FILED FEB. 15, 1905.

3 SHEETS—SHEET 1.

WITNESSES

INVENTOR

No. 828,838. PATENTED AUG. 14, 1906.
J. A. CHAMBERS.
COMBINED TANK AND POT FURNACE.
APPLICATION FILED FEB. 15, 1905.

3 SHEETS—SHEET 2.

WITNESSES INVENTOR

No. 828,838. PATENTED AUG. 14, 1906.
J. A. CHAMBERS.
COMBINED TANK AND POT FURNACE.
APPLICATION FILED FEB. 15, 1905.

3 SHEETS—SHEET 3.

WITNESSES

INVENTOR

UNITED STATES PATENT OFFICE.

JAMES A. CHAMBERS, OF ALLEGHENY, PENNSYLVANIA, ASSIGNOR, BY MESNE ASSIGNMENTS, TO GEORGE T. OLIVER, OF ALLEGHENY COUNTY, PENNSYLVANIA.

COMBINED TANK AND POT FURNACE.

No. 828,838.　　　　Specification of Letters Patent.　　　Patented Aug. 14, 1906.

Application filed February 15, 1905. Serial No. 245,780.

*To all whom it may concern:*

Be it known that I, JAMES A. CHAMBERS, of Allegheny, Allegheny county, Pennsylvania, have invented a new and useful Combined Tank and Pot Furnace, of which the following is a full, clear, and exact description, reference being had to the accompanying drawings, forming part of this specification, in which—

Figure 1:
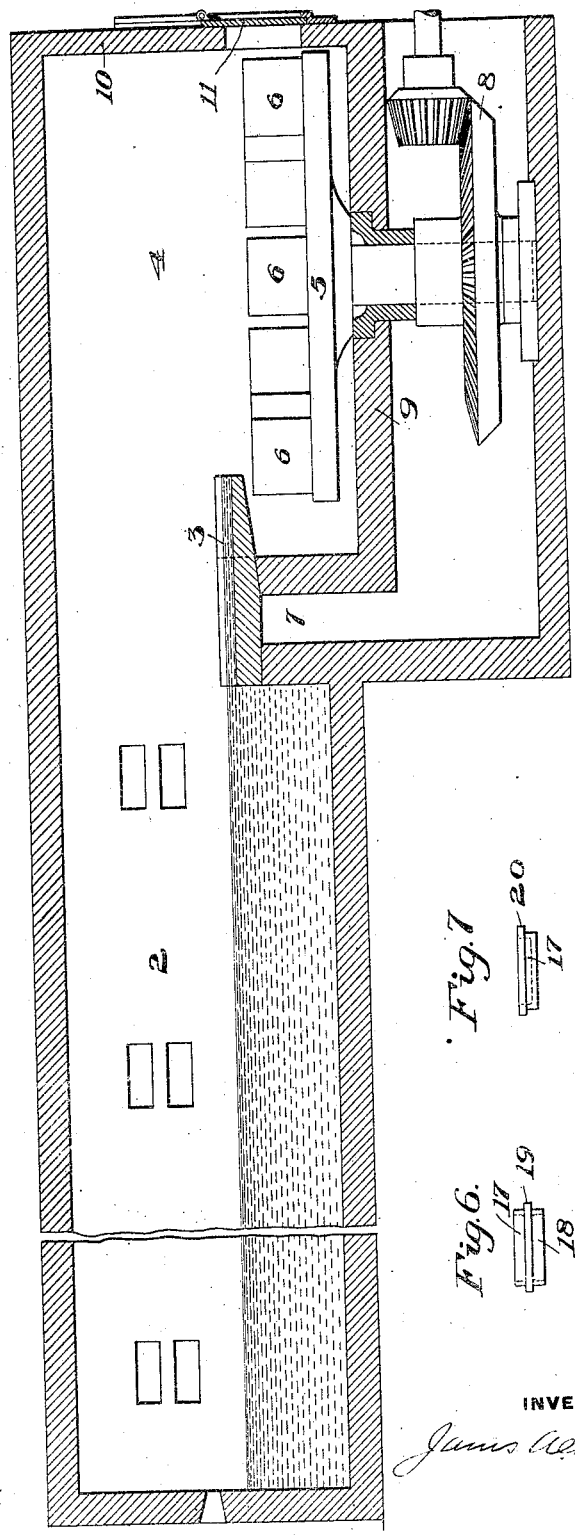
Figure 7:
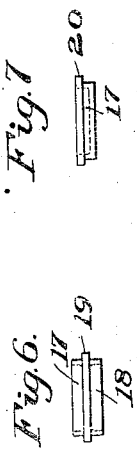
Figure 6:
Figure 2:
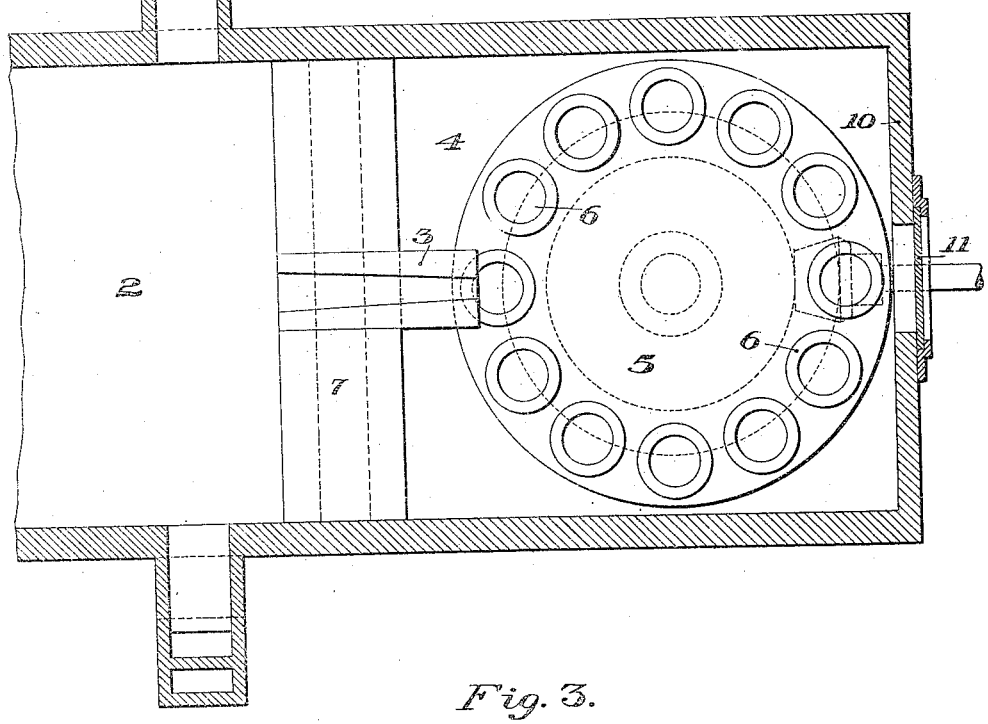
Figure 3:
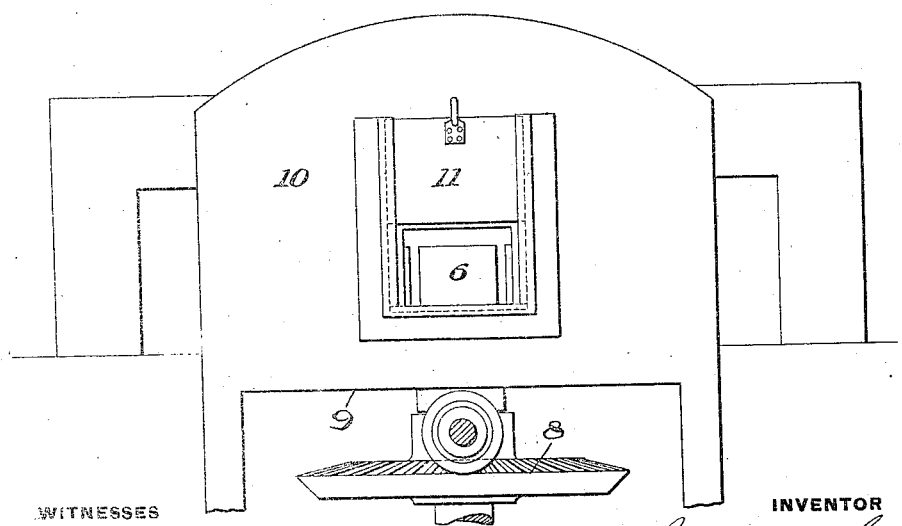
Figure 4:
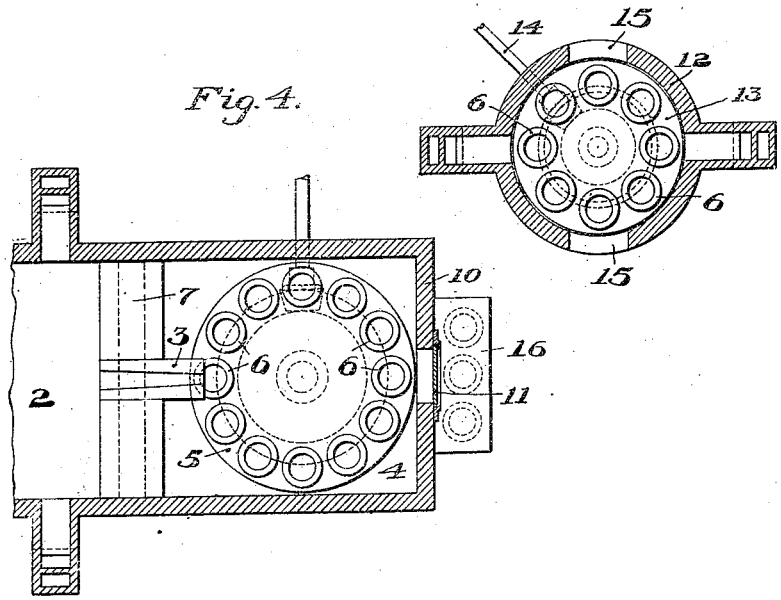
Figure 5:
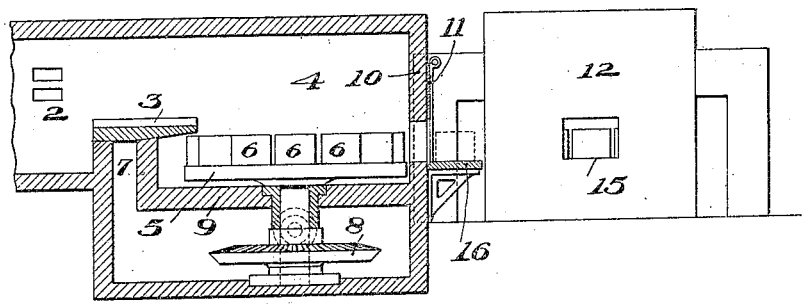

Figure 1 is a sectional side elevation showing a portion of my improved furnace. Fig. 2 is a partial horizontal section. Fig. 3 is an end elevation. Fig. 4 is a sectional plan view of a modified form. Fig. 5 is a sectional elevation of the same. Figs. 6 and 7 are side elevations of forms of pots which I preferably employ when the glass is drawn into articles.

My invention relates to the manufacture of glass and glass articles, and it is designed to provide means for melting glass in a tank-furnace, causing it to overflow into pots within a chamber in the tank-setting and the heating or fining of glass in these pots, the pots being successively taken out from the heating-chamber and replaced by empty pots.

In the drawings, referring to Figs. 1, 2, and 3, a portion of a glass-tank furnace is indicated by 2, which furnace at the end opposite to that where the batch is fed in is provided with an overflow-trough 3. Above this trough the tank-chamber communicates with a pot-chamber 4, containing a rotary turn-table 5, in which pots 6 are set in an annular series. The bridge-wall 7 between the tank and pot chamber may be either hollow or solid, and the bevel-gear 8 for turning the table may be located in a pit beneath the bottom 9 of the pot-chamber proper. The outer end of the pot-chamber is closed by a wall 10, having a door-opening closed by a vertical sliding door 11.

In using the apparatus the glass is allowed to overflow from the tank into the successive pots and the pot-table is turned intermittently and the pots become filled. As each pot leaves the overflow-trough the glass in the pot will be fined and settled during the time until the pot reaches the door-opening. This pot is then carried out through the door-opening and an empty pot set on the table in its place. The pot taken out may be used to cast the glass upon a table for plate-glass, or it may be used for drawing glass therefrom in the form of cylinders, sheets, or other articles. The operation may go on continuously, as the pots are in position to successively receive the glass flowing through the overflow-trough. Each empty pot when inserted will be heated up before it reaches the position for filling.

In Figs. 4 and 5 I show a form similar to that of Fig. 1, except that an additional furnace 12 is provided at a convenient point adjacent to the door-opening of the main furnace. This furnace 12 may be provided with a rotary carrier or table 13 to support the pots, which may be rotated through gearing from the shaft 14. This furnace may have one or more openings 15, through which the pots may be inserted and removed. This extra furnace may be used where the pots are dipped and the glass may need extra fining and heating. It may also be used for heating up the empty pots before putting them in the main furnace. In these figures also I show a shelf or support 16 in front of the door 11, on which the pots may be raised while drawing out or inserting them.

In Figs. 6 and 7 I show two forms of pots which I prefer to employ where the glass is to be drawn into cylinders, sheets, or other articles. In Fig. 6 I show a double pot having two similar containing-cavities 17 and 18 and a central projecting ring 19. The pot of Fig. 7 is the same, except that it has a single cavity and the ring 20 surrounds its top. The ring upon either pot will rest around the hole in the top stone of the furnace, in which hole the pot is set for drawing.

The advantages of my invention result from placing the pot-table wholly within the tank-setting. It is necessary for the proper fining of the glass that the temperature of the pot-chamber should bear a fixed relation to that of the tank-chamber, and I find that this fixed relation can be maintained if the pot-table be wholly open to the tank-chamber. The heat from the tank thus keeps the glass in the pots from chilling and serves to temper and fine it. The use of intermediate ladles, &c., is avoided, and the operation is simply and easily carried on.

I am aware that it has been proposed to provide a pot-table in a separate chamber adjacent to the tank-chamber, but not in open communication therewith, said construction requiring a separate furnace for the firing. I am also aware that it has been proposed to locate the pot-table partly within and partly outside of a tank-chamber, which renders it impossible to close the chamber to prevent chilling the glass in the pots, and I do not claim such constructions.

Having thus described my invention, what I claim, and desire to secure by Letters Patent, is—

1. A tank-furnace having a pot-chamber at one end, a rotary table located entirely within the pot-chamber and carrying an annular series of pots, an overflow-trough leading from the tank-chamber and arranged to feed glass directly into the successive pots, and means for turning the pot-table, the pot-chamber being separated from the tank-chamber by a bridge-wall or dam, and being opened with and communicating directly with the tank-chamber above the dam or overflow and having an opening for taking out the pots; substantially as described.

2. A tank-furnace having a tank-chamber and a pot-chamber in direct and open communication therewith, a movable carrier within the pot-chamber and having pots thereon, and an adjacent heating-furnace containing a pot-carrier; substantially as described.

In testimony whereof I have hereunto set my hand.

JAMES A. CHAMBERS.

Witnesses:
GEO. B. BLEMING,
JAMES K. BAKEWELL.